Figure 1:
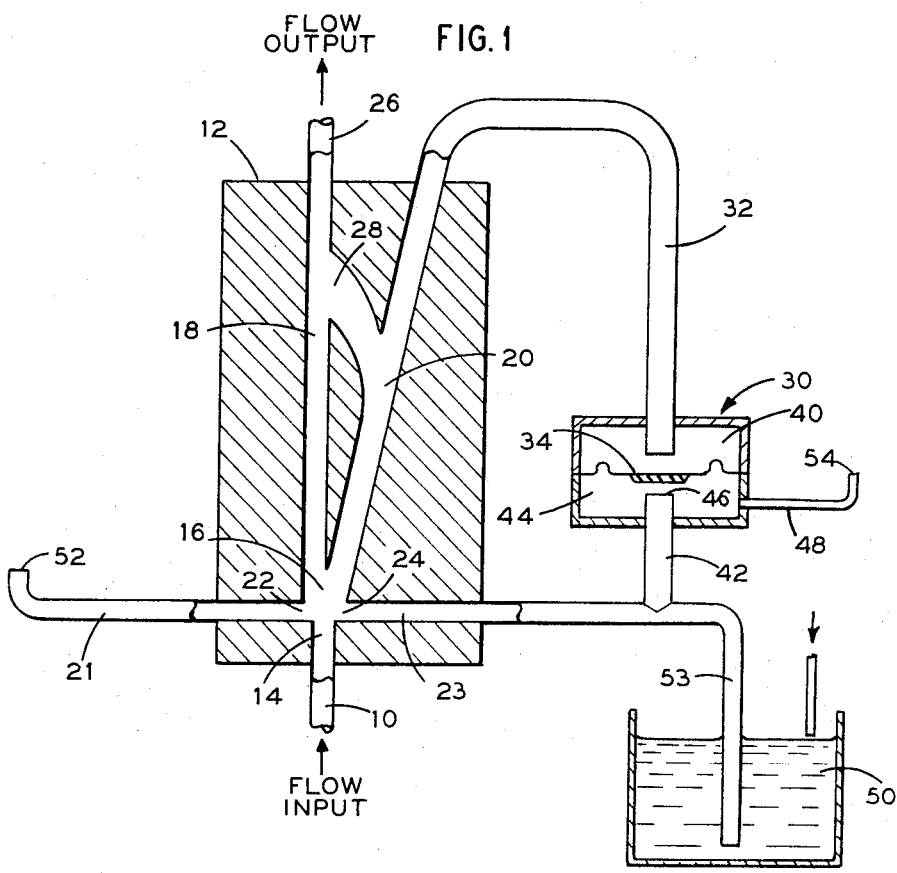

United States Patent

[11] 3,630,217

| [72] | Inventor | Edward H. Bell<br>Clinton, N.J. |
|---|---|---|
| [21] | Appl. No. | 27,911 |
| [22] | Filed | Apr. 13, 1970 |
| [45] | Patented | Dec. 28, 1971 |
| [73] | Assignee | American Standard Inc.<br>New York, N.Y. |

[54] LIQUID ADDITIVE DISPENSER USING A FLUIDIC DEVICE
8 Claims, 2 Drawing Figs.

| [52] | U.S. Cl. | 137/81.5 |
|---|---|---|
| [51] | Int. Cl. | F15c 3/04 |
| [50] | Field of Search | 137/81.5 |

[56] References Cited
UNITED STATES PATENTS

| 3,468,325 | 9/1969 | Bowles | 137/81.5 |
|---|---|---|---|
| 3,331,380 | 7/1967 | Schonfeld et al. | 137/81.5 |
| 3,389,894 | 6/1968 | Binder | 137/81.5 X |
| 3,392,741 | 7/1968 | Shinn | 137/81.5 |
| 3,417,770 | 12/1968 | Denison | 137/81.5 |
| 3,467,122 | 9/1969 | Jones | 137/81.5 |
| 3,472,225 | 10/1969 | Burns | 137/81.5 X |
| 3,537,449 | 11/1970 | Foxwell et al. | 137/81.5 X |
| 3,538,931 | 11/1970 | Blosser, Jr. et al. | 137/81.5 |

*Primary Examiner*—Samuel Scott
*Attorneys*—Sheldon H. Parker, Tennes I. Erstad and Robert G. Crooks ABSTRACT: A monostable element designed to be vacuum-switched supports interconnecting passages wherein a stream of pressurized fluid can flow through a selectable one of said interconnecting passages, the path of the stream of pressurized fluid being determined by two control passageways for alternately switching the fluid stream from one of the passages to the other, and pressure control means coupled to one of the control passageways to selectively feed a liquid additive through said control passageway to mix with the stream of pressurized fluid.

PATENTED DEC 28 1971 3,630,217

INVENTOR.
Edward H. Bell
BY Sheldon H. Parker
ATTORNEY

LIQUID ADDITIVE DISPENSER USING A FLUIDIC DEVICE

This invention relates generally to a liquid-additive dispenser and more particularly to a fluidic device for injecting a liquid additive into a fluid stream.

It is an object of the present invention to provide a fluidic device for selectively feeding a liquid additive into a fluid stream.

It is another object of the present invention to provide a fluidic device which has a minimum of moving parts for selectively feeding a liquid additive into a fluid stream.

It is an additional object of the present invention to provide a fluidic device for selectively feeding a liquid additive into a fluid stream which will maintain a given condition of operation until positively driven to a new condition of operation.

It is also an object of the present invention to provide a fluidic device for selectively feeding a liquid additive into a fluid stream which provides complete backflow protection.

It is also an object of the present invention to provide a fluidic device for selectively feeding a liquid additive into a fluid stream which is accurate over a wide range of fluid stream pressures, provides accurate metering of the additive proportioned to the flow rate of the fluid stream, and will not dispense additive when first turned on until instructed to do so.

It is also an object of the present invention to provide a fluidic device for selectively feeding a liquid additive into a fluid stream which is reliable in operation and economical to build.

These and further objects and advantages of the present invention are achieved, in general, through a source of pressurized fluid, a monostable element designed to be vacuum-switched and having interconnecting fluid passages wherein a stream of pressurized fluid can flow from an inlet orifice through a selected one of two outlet passages, control passageways being provided for alternately switching the fluid stream from one of the outlet passages to the other, and pressure control means to selectively feed a liquid additive through a control passageway to the stream of pressurized fluid.

Figure 2:
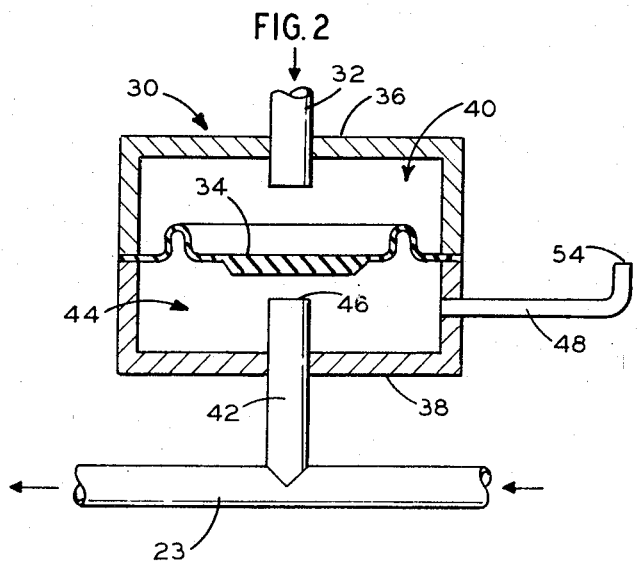

The novel features that are considered characteristic of this invention are set forth with particularlity in the appended claims. The invention itself, however, both as to its organization and method of operation, as well as additional objects and advantages thereof, will best be understood from the following description when read in connection with the accompanying drawing wherein:

FIG. 1 is a schematic view of structure in accordance with the principles of the invention; and FIG. 2 is an enlarged sectional view of the pressure control means of the structure of this invention.

Referring to FIG. 1, there is illustrated a source of high-pressure fluid 10 coupled to fluidic switch means 12 such as a monostable element designed to be vacuum-switched. The monostable element 12 is illustrated as having interconnected fluid passageways wherein a high-pressure fluid can flow from a source of high-pressure fluid through an inlet aperture 14 to a chamber 16, and then to either of two outlet passageways 18, 20. Fluid control nozzles 22, 24 are provided at the chamber 16. A first control passageway 21 is coupled to fluid control nozzle 22; and, a second control passageway 23 is coupled to fluid control nozzle 24. The walls of the chamber of the monostable element are formed in a manner well known to those familiar with the art so that the high pressure fluid is caused to be attached to one of the sidewalls of an outlet passageway and remain attached to the sidewall without any control fluid flow. The high-pressure fluid stream can be deflected to become attached to the opposite wall of the other outlet passageway by a control fluid flow and remain attached to the opposite wall of the other outlet passageway even after the control fluid flow is stopped.

Continuing, the chamber 16 leads into the two outlet passageways 18, 20. Outlet passageway 18 is a straight-through passageway to an outlet orifice 26. Outlet passageway 20 diverges or angles away from the outlet passageway 18 and is coupled to the outlet orifice 26 through a return passageway 28 and to a pressure sensitive diaphragm chamber 30 through a passageway 32.

Referring specifically to the pressure-sensitive diaphragm chamber 30 as illustrated in detail in FIG. 2, a flexible member 34 composed of neoprene, rubberized fabric or the like which is not permeable to air or water is securely positioned between an upper or inverted cup-shaped section 36 and a lower or cup-shaped section 38. The upper section 36 is secured rigidly to the lower section by any convenient means such s bolts, clamps, bonding or the like. The passageway 32 is shaped and positioned to terminate within the chamber 40 defined by the upper or inverted cup-shaped section 36 and the flexible member 34. In a like manner, the second control passageway 23 is coupled through a passageway 42 to the chamber 44 defined by the lower or cup-shaped section 38 and the flexible member 34. The end 46 of the passageway 42 is positioned to be contacted by and closed by the flexible member 34 when the flexible member 34 is urged to move downward. At all other times when the flexible member 34 is in its normal at rest position, the end 46 of the passageway 42 is open. A passageway 48 is provided through the lower or cup-shaped section 38 to permit the pressure in chamber 44 to be opened to and substantially equal to atmospheric pressure.

A reservoir 50 which contains the additive that is to be added to the fluid stream supports a tube 53 which extends from the bottom of the reservoir 50 to the junction of passageway 42 with passageway 23.

REferring now to the operation of the invention, FIG. 1 illustrates structure in accordance with the principles of this invention for injecting or adding an additive into a fluid stream. The fluidic device 12 can be a monostable element designed to be vacuum-switched. When the flow of fluid is directed through the inlet aperture 14, a low pressure occurs at the port 52 of control passageway 21, and a low pressure occurs at the port 24 of passageway 3, and a low pressure occurs at the port 54 of passageway 48. The flow of fluid will normally be attached to the straight wall of outlet passageway 18 when first turned on and flow out through the outlet orifice 26. When the port 54 is closed by means of an electrically operated valve, the end of the operators finger or the like, the fluidic device will switch and the flow will attach to the angled wall of outlet passageway 20 and flow through return passageway 28 to then flow out through the outlet orifice 26. During those instances when the flow of fluid is directed through the outlet passageway 20, the passageway 42 is sealed from the atmosphere through the action of the flexible member 30, and the liquid in the additive reservoir 50 is drawn up through the tube 52 and passes through the control passageway 23 to be fed into the fluidic device and mix with the fluid flow.

The flexible member 34 is positioned normally above the end 46 of the passageway 42 to permit the passageway 42 to communicate through the chamber 44 and passageway 48 to the atmosphere. Additionally, the flexible member 34 is designed to have a restoring force that is slightly greater than the suction force present at the end 46 of the passage 42 is less than the restoring force of the flexible member and is not sufficient to hold the flexible member down against the end 46.

Since the suction in the chamber 44 is not sufficient to hold the flexible member 34 down onto the end 46 of the passageway 42, a portion of the fluid flow is directed to the chamber 42 through the passageway 32 which, when added to the suction in the chamber 44 is greater than the restoring force of the flexible member 34 and holds the flexible member 34 against the end 46 of the passageway 42 when the fluid flow is passing through the passageway 20.

Thus, the structure can be switched to feed additive to a fluid flow by merely covering the port 54 of the passageway 48 for a short interval of time sufficient to permit the fluid flow to switch to passageway 20, and the additive will be fed continuously to the fluid stream until port 52 of control passageway 21 is then covered for a short interval of time sufficient to permit the fluid flow to switch back to passsageway 18.

Now, if it is assumed that the fluid flow is passing through the passageway 20 and return passageway 28 to the outlet orifice 26, then when the port 52 of the control passageway 21 is covered, the fluid flow will switch from the angled wall of passageway 20 to the straight wall of passageway 18 because of the lower pressure at port 52 and in the control passageway 21 relative to the pressure in control passageway 23. When the fluid switches from the passageway 20 to the passageway 18, the pressure within the chamber 40 is decreased and, with the reduction of pressure in the chamber 40 the flexible member 34, acting through its restoring force, raises off the end 46 of the passageway 42 to allow air to be sucked through the end 46. The opening of the end 46 to the atmosphere stops the flow of additive from the reservoir 50 through the tube 53 and control passageway 23 to the fluid flow.

The port 52 of the control passageway 21 need not remain covered once the flow of fluid has switched from passageway 20 to passageway 18 as the fluidic switch means is designed to be a monostable element.

It is to be noted that the ports 52, 54 of the control passageways 21, 23 are open to the atmosphere. Therefore, in those applications where the output is being sprayed into the air, or where the fluid stream from the outlet orifice passes through an air gap, this device provides complete backflow protection.

In some applications it may be desirable to provide a device that feeds a liquid additive to a fluid stream for short precisely controlled intervals of time. In these instances, the structures of FIG. 1 can be modified by eliminating the pressure-sensitive diaphragm chamber 30 and the passageway 32. In some instances, the passageways 20 and 28 can also be eliminated together with control passageway 21. Now, by sealing the end 46 of the passageway 42, liquid additive is pulled through tube 53 and passageway 23 to mix with the fluid flow. Immediately upon opening end 46 of passageway 42, to the atmosphere, the flow of liquid additive stops. Thus, in actual use, the operator need only place his finger on end 46 of passageway 42 to add liquid additive to the fluid flow; and, remove his finger from the end 46 to stop the flow of liquid additive.

Obviously many modifications and variations of the present invention are possible in the light of the above teaching. It is, therefore, to be understood that the invention may be practiced otherwise than as specifically described herein.

What is claimed is:

1. A fluidic device for injecting a liquid additive to a fluid stream comprising a fluidic switch means to selectively feed a fluid stream through a first passageway or a second passageway, said fluid switch having at least one control inlet, a reservoir for holding liquid additive, and additive control means coupled to said fluidic switch means to control the feeding of liquid additive from said reservoir to the fluid stream, said additive control means including a third passageway providing communication between said reservoir and said at least one control inlet, a diaphragm control having two chambers, said second passageway connecting one chamber at said diaphragm control and said fluidic switch means, a fourth passageway providing communication between said third passageway and the other chamber of said diaphragm control, said other chamber permitting flow between the atmosphere and said third passageway, only when said fluid stream in said fluid switch is not flowing through said second passageway.

2. A fluidic device for injecting a liquid additive to a fluid stream comprising a monostable fluidic switch means to selectively feed a fluid stream through a first passageway or a second passageway, a reservoir for holding liquid additive, and additive control means coupled to said fluidic switch means to control the feeding of liquid additive to the fluid stream, said fluidic switch including a first control passageway to direct a fluid stream through said first passageway and a second control passageway to direct a fluid stream through said second passageway wherein said control passageways are normally open to the atmosphere and said monostable element is vacuum-switched, and said additive control means including a T-connective, the horizontal passageway of the T-connection being interposed between said second control passageway and said reservoir and the vertical passageway being opened to the atmosphere where closing the vertical passageway to the atmosphere switches the fluid stream from the first passageway to the second passageway and causes liquid additive to be fed to the fluid stream.

3. The structure of claim 2 including a pressure-sensitive diaphragm chamber interposed between said T-connection and said second passageway of said monostable element.

4. The structure of claim 3 wherein said pressure sensitive diaphragm chamber comprises a first chamber, a second chamber, a diaphragm interposed between said first chamber and said second chamber.

5. The structure of claim 4 including a third passageway interposed between said first chamber of said pressure-sensitive diaphragm chamber and said monostable element, said vertical passageway of said T being coupled to the second chamber of said pressure-sensitive diaphragm chamber, and a passageway to couple the second chamber of said pressure-sensitive diaphragm chamber to atmosphere.

6. The structure of claim 5 wherein said third passageway is coupled to said second passageway of said monostable element to feed a positive to the first chamber of said pressure-sensitive diaphragm chamber when a fluid stream flows through said second passageway.

7. The structure of claim 6 wherein said diaphragm is positioned to be urged to block the end of said vertical passageway of aid T when a fluid stream flows through said second passageway.

8. The structure of claim 7 wherein said diaphragm has a restoring force greater than the pressure present in the vertical passageway of said T when a fluid stream flows through said second passageway and less than the pressure present in both the vertical passageway of said T and in said first chamber when a fluid stream flows through said second passageway.

* * * * *